(12) United States Patent
Sebastian

(10) Patent No.: US 8,516,069 B1
(45) Date of Patent: Aug. 20, 2013

(54) OPTIMIZER-TO-LINK LAYER INTERFACE USING DYNAMIC BUFFERING

(75) Inventor: William B. Sebastian, Quincy, MA (US)

(73) Assignee: ViaSat, Inc., Carlsbad, CA (US)

(*) Notice: Subject to any disclaimer, the term of this patent is extended or adjusted under 35 U.S.C. 154(b) by 421 days.

(21) Appl. No.: 12/894,336

(22) Filed: Sep. 30, 2010

Related U.S. Application Data

(60) Provisional application No. 61/247,489, filed on Sep. 30, 2009.

(51) Int. Cl.
- *G06F 15/167* (2006.01)
- *H04L 12/26* (2006.01)
- *H04B 7/185* (2006.01)
- *H04B 7/212* (2006.01)

(52) U.S. Cl.
USPC ........... 709/213; 370/235; 370/252; 370/316; 370/321; 370/322

(58) Field of Classification Search
USPC .................................................. 709/213, 226
See application file for complete search history.

(56) References Cited

U.S. PATENT DOCUMENTS

| | | | |
|---|---|---|---|
| 2003/0031141 A1* | 2/2003 | Schweinhart et al. | 370/316 |
| 2007/0252724 A1* | 11/2007 | Donaghey et al. | 340/905 |
| 2008/0037428 A1* | 2/2008 | Nation et al. | 370/235 |

* cited by examiner

*Primary Examiner* — Wing F Chan
*Assistant Examiner* — David X Yi
(74) *Attorney, Agent, or Firm* — Kilpatrick Townsend & Stockton LLP

(57) ABSTRACT

Systems and methods are described for communicating overhead data in a way that complies with applicable protocols while using return-link bandwidth more efficiently, for example, by providing a shared memory at an interface between lower layers and higher layers of a protocol stack. In one exemplary configuration, a shared dynamic buffer is provided at the interface between a closely coupled client optimizer and link layer of a user system. For example, the dynamic buffer is used to supplement or replace the FIFO queue typically at the interface between Layers 2 and 3 of the OSI protocol stack for the TCP protocol. The client optimizer continually and efficiently maintains current status data in the shared memory (e.g., ACK or NACK data, FEC data, partial packets, etc.). This status data can be uploaded by the link layer according to upload bandwidth allowances granted by a protocol partner.

12 Claims, 5 Drawing Sheets

OPTIMIZER-TO-LINK LAYER INTERFACE USING DYNAMIC BUFFERING

CROSS-REFERENCES TO RELATED APPLICATIONS

This application claims the benefit of and is a non-provisional of U.S. Provisional Application Ser. No. 61/247,489, filed on Sep. 30, 2009, titled "METHODS AND SYSTEMS FOR IMPLEMENTING A DYNAMIC BUFFER TO REPLACE PACKET QUEUE," which is hereby expressly incorporated by reference in its entirety for all purposes.

BACKGROUND

Various protocols, including the transmission control protocol (TCP), communicate various types of overhead data in addition to the desired payload data to facilitate reliable delivery of the payload data. For example, after each packet is received, a receiver may send an acknowledgment (ACK) packet back to the sender, or forward error correction (FEC) data and/or other types of data may be communicated back to the sender for various reasons. These and other types of overhead data can use appreciable amounts of return-link bandwidth, particularly in support of communication of large amounts of forward-link data (e.g., being downloaded by the receiver).

In many typical communications system architectures, the return link has limited bandwidth and operates according to upload bandwidth allowances from a protocol partner. For example, in a typical satellite network configuration, bandwidth may be allocated to a client-side system by a server-side system as "grants" (e.g., blocks of bandwidth). The client may completely or partially fill a grant for upload with the contents of a queue. The client then waits until receiving another grant before uploading more data.

Notably, while the client waits for each new grant, the queue (e.g., a FIFO queue) is continually loaded with overhead and/or other return-link data. For example, if a client is waiting for new grants to send ACK packets and/or other overhead data, new data may be prevented or delayed from being sent. Additionally, the overhead data may take up room in a grant that could otherwise be used for communicating payload or other data, including potentially more valuable or sensitive data.

Accordingly, it may be desirable to communicate overhead data in a way that complies with applicable protocols while using return-link bandwidth more efficiently.

SUMMARY

Among other things, methods, systems, devices, and software are provided for communicating overhead data in a way that complies with applicable protocols while using return-link bandwidth more efficiently, for example, by providing a shared memory at an interface between lower layers and higher layers of a protocol stack. In one exemplary configuration, a shared dynamic buffer is provided at the interface between a closely coupled client optimizer and link layer of a user system. For example, the dynamic buffer is used to supplement or replace the FIFO queue typically at the interface between Layers 2 and 3 of the OSI protocol stack for the TCP protocol. The client optimizer continually and efficiently maintains current status data in the shared memory (e.g., ACK or NACK data, FEC data, partial packets, etc.). This status data can be uploaded by the link layer according to upload bandwidth allowances granted by a protocol partner.

In one set of embodiments a method is provided. The method includes: receiving an upload allocation at a link layer of a user system from a partner system over a communications link, the upload allocation indicating an amount of resources allocated for communications to the partner system over a return link portion of the communications link; generating, using a client optimizer of the user system, status data indicating a current state of dynamically changing data intended for upload to the partner system; overwriting at least a portion of a status data block with the status data using the client optimizer, the status data block stored in a dynamic buffer implemented at an interface between the link layer and the client optimizer; generating a status upload comprising at least some of the status data in the status data block; and communicating the status upload to the partner system over the return link in accordance with the upload allocation using the link layer.

In another set of embodiments, a user system is provided. The user system includes: a shared memory subsystem having a dynamic buffer configured to store a status data block; a link management subsystem, communicatively coupled with the shared memory subsystem and communicatively coupled with a partner system over a communications link, and configured to: receive an upload allocation from the partner system indicating an amount of resources allocated for communications to the partner system over a return link portion of the communications link; and generate a status upload including at least a portion of the status data block for upload to the partner system over the return link in accordance with the upload allocation; and a client optimizer, communicatively coupled with the shared memory subsystem such that the memory subsystem is implemented at an interface between the link management subsystem and the client optimizer subsystem, and configured to periodically overwrite at least a portion of the status block with dynamically changing status data for upload by the link management subsystem.

In yet another set of embodiments, a computer program product is provided that resides on a processor-readable medium disposed at a user system and has processor-readable instructions, which, when executed, cause a processor to perform steps. The steps include: receiving an upload allocation at a link layer of a user system from a partner system over a communications link, the upload allocation indicating an amount of resources allocated for communications to the partner system over a return link portion of the communications link; generating, using a client optimizer of the user system, status data indicating a current state of dynamically changing data intended for upload to the partner system; overwriting at least a portion of a status data block with the status data using the client optimizer, the status data block stored in a dynamic buffer implemented at an interface between the link layer and the client optimizer; generating a status upload comprising at least some of the status data in the status data block; and communicating the status upload to the partner system over the return link in accordance with the upload allocation using the link layer.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
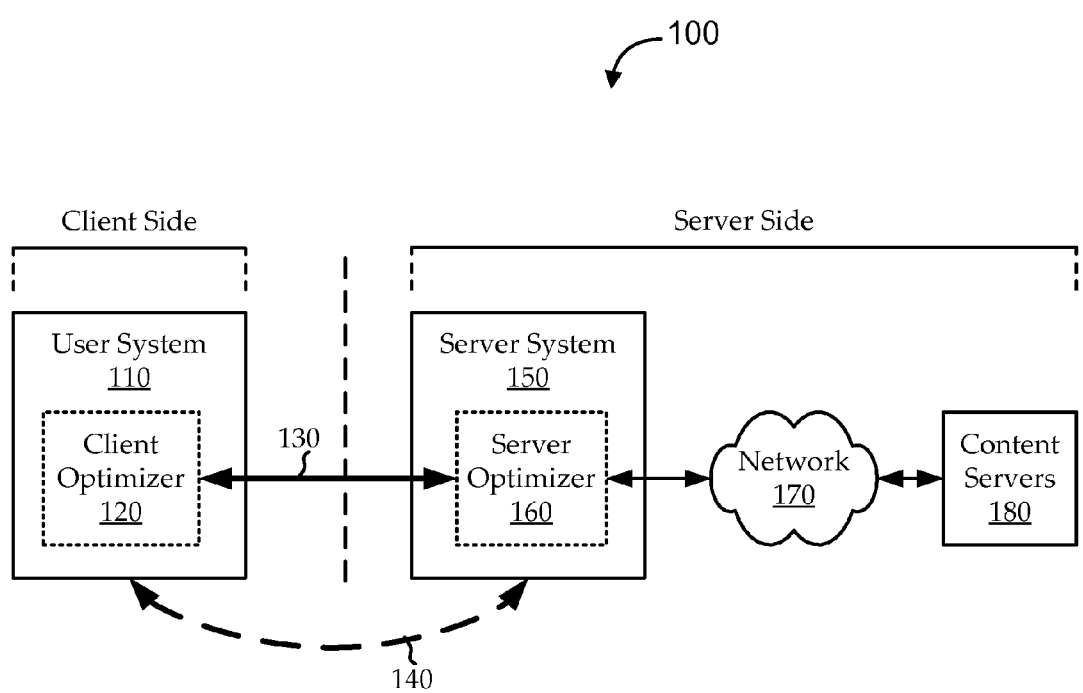
FIG. 1 shows a simplified block diagram of a communications system for use with various embodiments.

In the appended figures, similar components and/or features may have the same reference label. Further, various components of the same type may be distinguished by following the reference label by a second label that distinguishes among the similar components. If only the first reference label is used in the specification, except where otherwise noted, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It should be understood that various changes may be made in the function and arrangement of elements without departing from the spirit and scope as set forth in the appended claims.

Embodiments are provided for communicating overhead data in a way that complies with applicable protocols while using return-link bandwidth more efficiently. Typically, communications systems operate according to one or more transport protocols, and each protocol can be illustrated according to a stack. For example, many Internet protocols (e.g., the Transport Control Protocol (TCP)) may be illustrated in the context of a standard, seven-layer OSI protocol stack. While different stacks may include different numbers and types of layers, stacks are generally referred to herein as having at least one "lower" or "link" layer, and at least one "higher" or "optimizer" layer. For example, according to the OSI stack, the "lower" layers may include Layers 1 and 2 (i.e., the physical and data link layers), while the "higher" layers may include Layers 3-7 (i.e., the network, transport, session, presentation, and application layers).

Operation of the protocol may involve certain types of feedback, including communication of overhead data over the return link (e.g., from a client back to a server) to indicate various transport state information. For example, the overhead data may include ACK packets, forward error correction (FEC) data, and/or other data for indicating to the sender whether packets were successfully received, etc. Often, a first-in-first-out (FIFO) queue is provided at an interface between the lower and higher layers of the stack. For example, the higher layers generate the overhead data (e.g., an ACK packet) and push the overhead data to the queue. The lower layers then sequentially pull data from the queue for upload to the sender (e.g., as part of a grant or other upload allowance).

For the sake of illustration, suppose a user terminal is downloading data from a base station over a satellite communications link. The user terminal downloads "packet 1," which is received ultimately at the higher layers of its stack for use by an application. The packet may be for any data type, for example, a text document, an email message, a media file, a webpage, etc. After packet 1 has been successfully downloaded by the user terminal, the higher layers generate "ACK packet 1," which is communicated to a queue in communication with the link layer. There, "ACK packet 1" waits until a satellite grant allocation is received by the user terminal for upload. While waiting for the grant, the user terminal continues to download packets from the base station and continues to send ACK packets to the queue.

At some time, a grant is received from the base station, and the link layer at the user terminal fills the grant from the queue. Notably, by the time the queued data is uploaded to the base station, at least some of the data may be outdated or superseded. Further, the grant may not be large enough to upload all the data from the queue, so that certain overhead data remains in the queue even longer (i.e., until another grant is received). Even further, the transport protocol (e.g., TCP) may wait to send additional packets to the user terminal until the previously sent packets have been acknowledged (e.g., until the corresponding overhead data has been received back at the base station). Still further, since each overhead data (e.g., each ACK packet) may be a separately queued packet, each may typically include its own payload, header, etc., which may result in an appreciable portion of the grant allocation needed for overhead uploads.

Notably, while some descriptions herein use descriptors like "overhead data," "status data," and the like, these descriptors are intended broadly to include any dynamically changing types of information that may be uploaded over the link. These types of data may include ACK and/or NACK packets, FEC data, partial packets, time-dependent data, etc. For example, conventional systems may send partial packets before it is optimal, or wait an undesirable amount of time for the packet to be complete, etc. because it may be difficult or impossible to dynamically update the partial packet (e.g., by adjusting header information to indicate the size of the packet, etc.). Rather, it may be desirable to constantly update the partial packet until it is ready to be uploaded, which may include appending payload data, adjusting header data, etc. Other types of time-dependent data may exhibit similar characteristics, including, for example, ephemeral data and data that becomes stale after some time.

At least as illustrated from the above example, typical handling of overhead data reduces the efficiency of communications, particularly over the return link. Accordingly, embodiments use various techniques for communicating overhead data in a way that complies with applicable protocols while using return-link bandwidth more efficiently, for example, by providing a shared memory at an interface between lower layers and higher layers of a protocol stack. In one exemplary configuration, a shared dynamic buffer is provided at the interface between a client optimizer (e.g., operating at the transport and application layers) and link layers of the protocol stack. For example, the dynamic buffer is used to supplement or replace the FIFO queue typically at the interface between Layers 2 and 3 of the OSI protocol stack for the TCP protocol. The client optimizer continually and efficiently maintains a current status in the shared memory in support of the transport protocol. For example, the status data indicates ACKs, NACKs, FEC data, and/or other useful overhead information. This status data can be uploaded by the link layer according to upload bandwidth allowances from a protocol partner.

Referring first to FIG. 1, a simplified block diagram is shown of a communications system 100 for use with various embodiments. The communications system 100 facilitates communications between a user system 110, a server system 150, and one or more content servers 180 via a client optimizer 120, a server optimizer 160, and a network 170. Embodiments of the user system 110 include any component or components for providing a user with network interactivity. For example, the user system 110 may include any type of computational device, network interface device, communications device, or other device for communicating data to and from the user.

Typically, the communications system 100 facilitates communications between multiple user systems 110 and a variety of content servers 180 (only one of each is shown for the sake of clarity). For example, a network 170 is shown between the server system 150 and the content servers 180, and a communications link 130 is shown between the server system 150 and the user system 110. Each of the network 170 and the communications link 130 may, in fact, include one or more networks, nodes, links, etc. For example, communications may occur over the Internet, Internet protocol ("IP") networks, intranets, wide-area networks ("WANs"), local-area networks ("LANs"), virtual private networks ("VPNs"), the Public Switched Telephone Network ("PSTN"), and/or any other type of network, wired and wireless connections, etc.

As used herein, "content servers" is intended broadly to include any source of content in which the users may be interested. For example, a content server 180 may provide website content, television content, file sharing, multimedia serving, voice-over-Internet-protocol (VoIP) handling, and/or any other useful content. It is worth noting that, in some embodiments, the content servers 180 are in direct communication with the server optimizer 160 (e.g., not through the network 170). For example, the server optimizer 160 may be located in a gateway that includes a content or application server.

The client optimizer 120 and the server optimizer 160 are configured to effectively provide an optimizer link 140 between the user system 110 and the server system 150, including providing certain communications functionality. Embodiments of the optimizer functionality (e.g., the server optimizer 160, the client optimizer 120, and the resulting optimizer link 140) can be implemented in a number of ways without departing from the scope of the invention. In some embodiments, optimizer components are implemented as proxies, such that the server optimizer 160 is a proxy server, the client optimizer 120 is a proxy client, and the optimizer link 140 is a proxy tunnel. For example, a transparent intercept proxy can be used to intercept traffic in a way that is substantially transparent to users at the client-side of the proxy tunnel.

In other embodiments, the optimizer is implemented as an in-line optimizer. For example, the client optimizer 120 is implemented within a user terminal and the server optimizer 160 is implemented within a provider terminal (e.g., a satellite base station or gateway, a cable head-end, a digital subscriber line access multiplexer (DSLAM), etc.). Other configurations are possible in other embodiments. For example, embodiments of the server optimizer 160 are implemented in the Internet cloud (e.g., on commercial network leased server space). Embodiments of the client optimizer 120 are implemented within a user's personal computer, within a user's modem, in a physically separate component at the customer premises, etc.

In certain embodiments, the server optimizer 160 acts as a transparent man-in-the-middle to intercept the data as it passes between the user system 110 and the content servers 180. Some purposes of the interception may include filtering, caching, parsing, and/or otherwise processing the requests and responses. For example, when the user system 110 requests a web object from a content server 180, the server optimizer 160 may intercept and parse the request to implement prefetching and/or other types of functionality. This and/or other types of functionality are implemented, at least in part, by using the optimizer link 140 functionality.

The optimizer link 140 is implemented over a communications link 130 having forward-link resources and return-link resources. It is assumed herein that the return link of the communications link 130 has limited bandwidth. It is further assumed herein that the return link operates according to "grants." While the term "grants" is typically used in the context of satellite communications systems, the term is intended herein to include any type of dynamic upload bandwidth allocation. For example, a grant may refer to any type of allowance communicated from the server side of the communications system (e.g., the server system 150) to the client side of the communications system 100 (e.g., the user system 110), which indicates the size and/or timing of an upload allowance over the return link of the communications link 130.

For example, the user system 110 downloads data from a content server 180 over the network 170 via the server system 150. Communication of the data over the communications link 130 is facilitated, at least partially, by the server optimizer 160 and the client optimizer 120. As described above, the server optimizer 160 and the client optimizer 120 operate according to one or more protocols, including at least one transport protocol. The transport protocol dictates that certain types of overhead data are needed, including overhead data to be communicated on the return link from the client optimizer 120 to the server optimizer 160 to indicate transport status. Accordingly, as the client optimizer 120 receives packets of the downloaded data, it generates the protocol-dictated status data for communication back to the server optimizer 160 over the return link.

Figure 2:
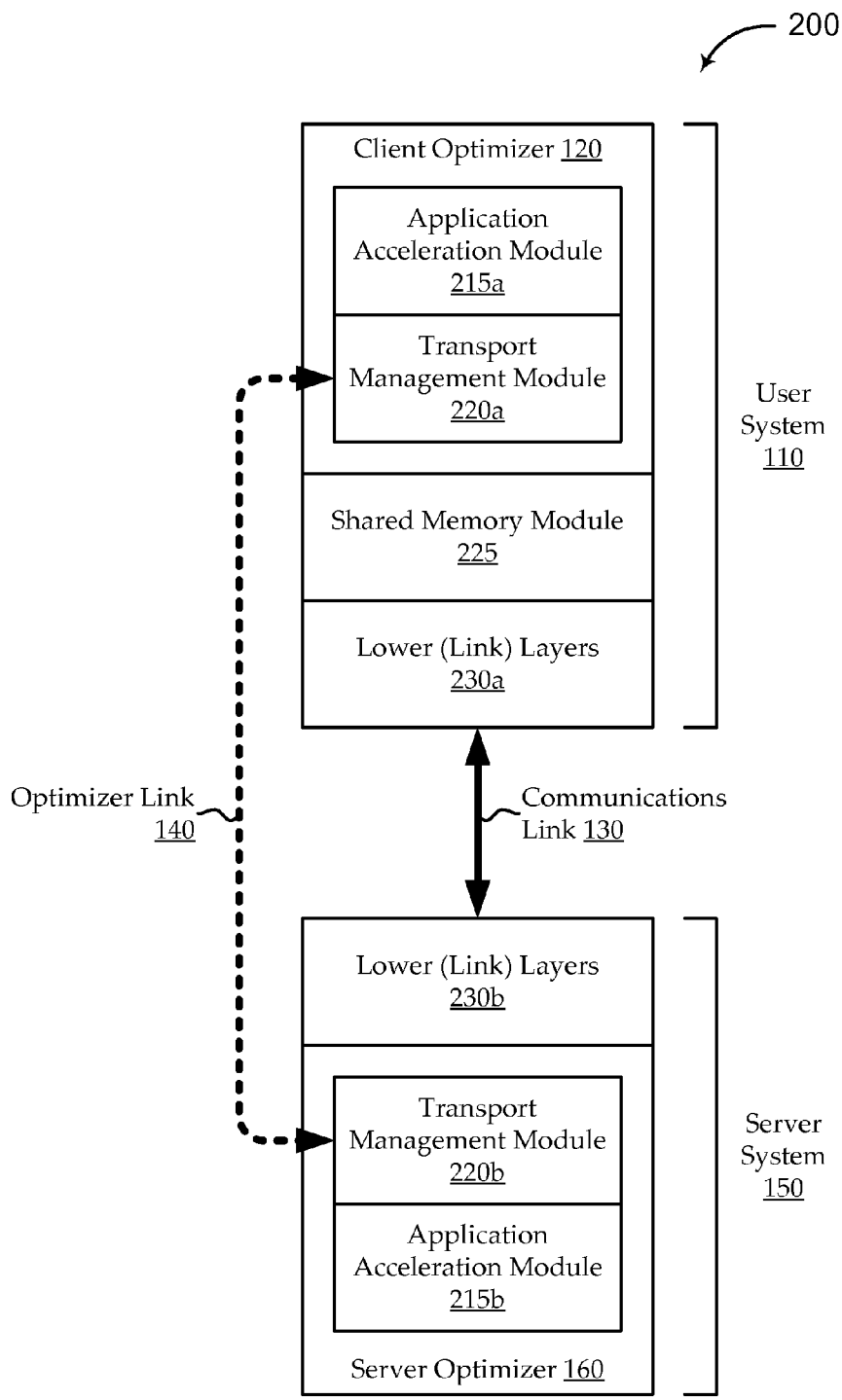
FIG. 2 illustrates an exemplary configuration of an optimizer pair, including a client optimizer and a server optimizer, according to various embodiments.

Notably, various configurations are possible for providing optimizer functionality with the client optimizer 120 and the server optimizer 160. FIG. 2 illustrates an exemplary configuration of an optimizer pair 200, including a client optimizer 120 and a server optimizer 160, according to various embodiments. The optimizer pair 200 may be implemented in the context of a larger communications system 100, for example, to provide optimizer link 140 functionality over a communications link 130. Further, as described above, the client optimizer 120 may be part of a user system 110, and the server optimizer 160 may be part of a server system 150.

As illustrated, the user system 110 includes (e.g., as part of a modem or other component) a shared memory module 225 in communication with the client optimizer 120 and lower layers 230a (e.g., according to a protocol stack). For the sake of clarity, the lower layers 230a are referred to herein as a "link layer" 230a, though more than one layer may be included. The link layer 230a at the user system 110 is in communication with a link layer 230b (i.e., or lower layers) of the server system 150. The link layer 230b of the server system 150 is in communication with the server optimizer 160.

According to some embodiments, the link layers 230 provide functionality similar to that of Layers 1 and 2 of the standard OSI stack. The client optimizer 120 and the server optimizer 160 each provides functionality similar to that of Layers 3-7 of the standard OSI stack. As described above, protocol-related functionality may be adjusted to facilitate efficient generation and communication of overhead data on the return link of the communications link 130. In some embodiments, the client optimizer 120 and the server optimizer 160 each includes an application acceleration module 215 and a transport management module 220. For example, the application acceleration modules 215 provide functionality similar to that of Layers 5-7 of the standard OSI stack, and the transport management modules 220 provide functionality similar to that of Layers 3 and 4 of the standard OSI stack.

The shared memory module 225 at the user system 110 is accessible by both the client optimizer 120 and the link layer 230a, so that both can read from and write to the shared memory module 225. The shared memory module 225 typically includes a dynamic buffer that is configured to maintain a current version of dynamically changing data. For example, status data (e.g., including overhead data, transport data, partial packets, etc.) may be constantly updated to reflect a current status of that data, which may involve overwriting some or all of a previously stored version of that data. Notably, embodiments of the user system 110 are configured so that the client optimizer 120 and the link layer 230a are closely coupled, which may allow for shared use of the shared memory module 225 without packetization or transport of the data within the user system 110.

It is worth noting that the server system may or may not have a memory module, and the memory module may or may not be shared. In some embodiments, the status data received at the link layer 230b is encapsulated into packets and sent over a network to the server optimizer 160. In other embodiments, the data is pushed from the link layer 230b to a FIFO queue, and is pulled from the FIFO queue by the server optimizer 160. Instill other embodiments, the server system 150 is configured such that the client optimizer 160 and the link layer 230b are closely coupled and communicate data via a shared memory module, like the one described with reference to the user system 110. Because internal operations of the server system 150 are not typically affected by return-link bandwidth and grant issues, like those affecting the user system 110, any useful type of data communications and/or memory systems can be used in various embodiments.

For example, data is downloaded by the user system 110 from the server system 150 over the communications link 130 and is received at the application acceleration module 215a of the client optimizer 120. The transport management module 220a of the client optimizer 120 generates appropriate status data according to the download, which is updated in the shared memory module 225 of the user system 110. Subsequently, the link layer 230a receives a grant from the server system 150. The link layer 230a retrieves the current status data from the shared memory module 225 and communicates the status data over the communications link 130 to the server system 150.

The status data is received by the server system 150 at its link layer 230b and is communicated (e.g., in turn) to the server optimizer 160. For example, the status data is pushed into a queue, used to update a status data block, etc. The data may then be used, as desired, by the transport management module 220b and/or the application acceleration module 215b of the server optimizer 160. For example, the status data is generated by the client-side transport management module 220a and communicated to the server optimizer 160 in accordance with (e.g., or to generate data at the server optimizer 160 that is in accordance with) applicable transport or other protocols.

User system 110 components are implemented to more efficiently communicate transport status feedback to the server system 150 over the return link. As described above, typical implementations (e.g., according to the TCP protocol) may continually generate overhead packets (e.g., including ACK packets, FEC data, etc.), which are pushed to a FIFO queue. Some of these packets may indicate whether a downloaded packet is successfully received, like ACK and NACK packets. Other types of overhead data are used for error correction, like FEC data.

Packet-level FEC data includes redundant copies of information from previous packets to aid in error correction. Every third packet, for example, can be created so that if either packet 1 or 2 is corrupted or dropped, the dropped packets can be restored using the data in 3 plus the original packet that was not dropped. There are many variations of this scheme with different levels of correction (ratio of redundant packets to original, etc.). Notably, FEC data may be treated as lower priority data in certain implementations. For example, FEC packets may be sent as insurance against a packet being dropped or corrupted only when extra space is available in a grant. If there is no room in a grant for the FEC data, a conventional approach including NACKs and retransmits may be used. When FEC data is not sent, drops may be discovered via NACKs, etc. and retransmitted as high priority data. In some embodiments, if there is no room for FEC data in a grant, old FEC data in the queue may be replaced with new FEC data corresponding to more recent download packets for upload in a subsequent grant. The FEC data may be valuable only for recently downloaded packets, as the savings (e.g., avoiding waiting for retransmits) may be greatest in the event of a recent packet being dropped.

Typically, many overhead packets are used to facilitate communications of large amounts of data over a communications system. Large numbers of overhead packets may use an appreciable amount of return-link bandwidth and may cause appreciable delays in communications, particularly in a grant-based context. Embodiments described herein efficiently maintain status data as a snapshot of the current transport status.

For example, in a typical implementation, after six packets are downloaded by a client, the client receives a grant. At that time, the client-side queue includes the following illustrative set of overhead packets: "ACK packet 1"; "ACK packet 2"; "NACK packet 3"; "FEC data packet for packets 1-3"; "ACK packet 4"; "ACK packet 5"; "ACK packet 6"; "FEC data packet for packets 4-6". Each of these packets includes its own payload, header, etc., and the grant may or may not be large enough to upload all the packets in the queue. According to embodiments, such as the one illustrated in FIG. 2, the shared memory module 225 of the user system 110 maintains status data as a snapshot. The transport management module 220a is configured to continually or periodically monitor and update the status data to reflect the current transport status. For example, according to the illustrative downloaded packets described above, the status data may include the following illustrative packets: "ACK packets 1-2 and 4-6"; "FEC data packet for packets 1-6". Notably, the same information may effectively be communicated over the return link, but the status data may be communicated using smaller amounts of data in fewer packets. This may, for example, reduce the impact of the transport feedback overhead on return-link bandwidth, be more likely to fit within a smaller grant allocation, etc., while still providing the desired feedback to the server system 150 in compliance with the transport protocol.

Figure 3:
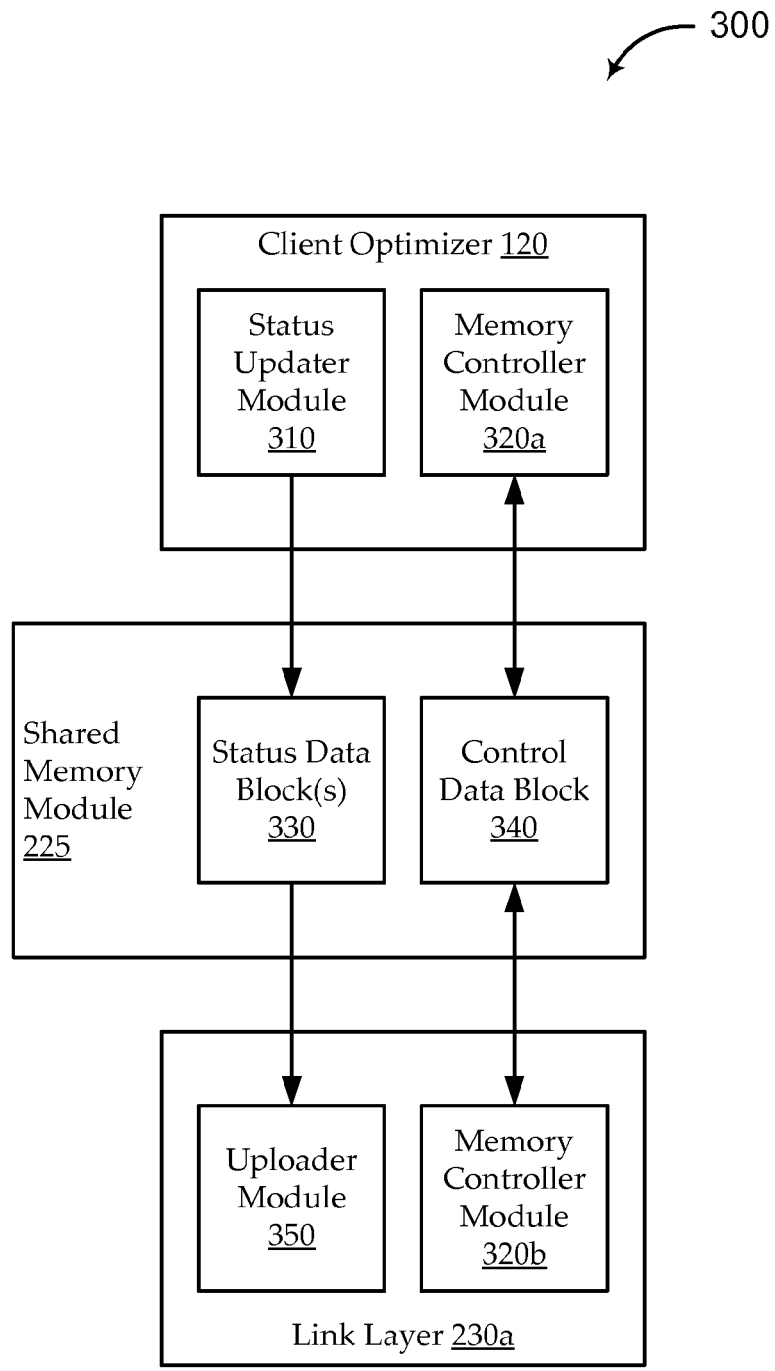
FIG. 3 shows a functional block diagram of an illustrative protocol handling portion of a user system, like the user system shown in FIG. 1 or 2.

The interaction between the client optimizer 120, the link layer 230a, and the shared memory module 225 can be implemented in various ways. For added clarity, FIG. 3 shows a functional block diagram 300 of an illustrative protocol handling portion of a user system, like the user system 110 shown in FIGS. 1 and 2. As illustrated, and as described above, the protocol handling is facilitated by interactions between a client optimizer 120, link layer 230a, and shared memory module 225. The shared memory module 225 includes a control data block 340 and one or more status data blocks 330. The client optimizer 120 includes a status updater module 310 for writing status data to the status data blocks 330 and a memory controller module 320a for interacting with the control data block 340. The link layer 230a includes a memory controller module 320b for interacting with the control data block 340 and an uploader module 350 for uploading status data from the status data blocks 330 in accordance with return-link grant allocations.

A status data block 330 stores status data indicating a current snapshot of the transport status. The status data may include any useful types of feedback data for use by the transport protocol. For example, the status data includes an indication of ACKs and NACKs, FEC data, etc. It is worth noting that, while embodiments are described herein with reference to status data, other return-link communications of other types of overhead data may be implemented in accordance with the techniques described herein. For example, certain specialized protocols may be configured to generate overhead data to facilitate various data compression, encryption, and/or acceleration techniques.

As described above, a grant allocation may or may not be large enough to accommodate all the data in the status data blocks 330. In the typical queue implementation, data may simply be read out in a sequential manner to the extent possible to fill the grant allocation. In the context of a dynamic buffer, however, it may be desirable or necessary to maintain one or more pointers and/or other data to indicate where data is being stored in the buffer, how much of the data is consumed, etc. This type of control data is stored in the control data block 340. In some embodiments, the control data block 340 stores an address of the status data block 330 (e.g., where the block of data begins in the buffer), a number of bytes available to the link layer 230a for upload (e.g., how many bytes past the address are being used to store the current status), and a number of bytes consumed by the last upload. For example, the control data in the control data block 340 may be stored as a control word.

In one exemplary configuration, the client optimizer 120 writes status data to the status data block 330. As described above, the status data may describe a current state of the transport, forward error correction (FEC) data with respect to recently sent packets, and/or any other data that is better sent via such dynamic buffer configuration. The client optimizer 120 may then write control data to the control data block 340. For example, the client optimizer 120 writes or updates a control word that indicates the address of the status data block 330 and the number of bytes available to be sent over the return link. The client optimizer 120 may write the control word to indicate that the "bytes consumed" for this control data bloc 340 is zero. In some embodiments, the control word is protected so that it is written atomically; either the memory controller module 320a of the client optimizer 120 or the memory controller module 320b of the link layer 230a reads or writes the value at any time. Typically, all values in the control word are modified at the same time, and the writer receives a copy of the values that were in effect prior to the write.

Subsequently, the link layer 230a receives a grant allocation and reads the control word from the control data block 340 to determine the location and size of the status data block 330 to be uploaded. The link layer 230a may then (e.g., as part of the same atomic operation) write or update the control word at the control data block 340 to indicate the bytes consumed as the quantity of bytes being uploaded as part of that grant. For example, if the grant is smaller than the bytes available, the link layer 230a may be unable to upload all the status data from the status data block 330 (e.g., the bytes consumed is less than bytes available). In some embodiments, the link layer 230a can consume additional bytes from this block for upload in subsequent grants until all the bytes available have been uploaded.

Notably, it may be desirable to upload the status data in the status data blocks 330 concurrently with uploading the data to the return link. For example, the client optimizer 120 desires to update the status data blocks 330 while the link layer 230a is reading the status data blocks 330 for upload to the return link. A number of configurations may be used to address that functionality.

According to some embodiments, two or more status data blocks 330 are provided for use in a "ping pong" fashion. For example, suppose the status data blocks 330 include a first status data block 330a and a second status data block 330b. The client optimizer 120 may begin by writing status data to status data block 330a. The status data in status data block 330a may continue to be updated by the client optimizer 120 until the link layer 230a is ready to read out the status data for upload. At this point, the client optimizer 120 may begin writing and/or updating status data to status data block 330b, allowing the current status data from status data block 330a to be read out by the link layer 230a without interference. The control data in the control data block 340 may be updated throughout the process to indicate the current address of the status data to reflect the ping ponging of the control data block 340 storage.

According to other embodiments, the one or more status data blocks 330 are configured to be "locked" by either or both of the link layer 230a and the client optimizer 120. For example, the client optimizer 120 continues to write and update status data in the status data block 330 until the link layer 230a is ready to read out the status data for upload. At this point, the link layer 230a may effectively lock the status data block 330 to prevent further writes from the client optimizer 120. The status data block 330 may remain locked during read out by the link layer 230a, and may subsequently be unlocked after the grant is filled. The control data in the control data block 340 may be updated throughout the process to indicate the current address of the status data, number of bytes consumed, etc. In some embodiments, the control data block 340 may be configured to indicate whether the status data blocks 330 are locked.

Other embodiments may include additional functionality. For example, certain embodiments of the user system 110 may not keep track of the number of bytes consumed. Rather, the status data may be continually updated to reflect the most important and/or most updated transport status information based on the current status, what has already been communicated, etc. For example, suppose that a portion of the status data indicates acknowledgement of the most recent five packets (e.g., "ACK<=5"), and the next received grant is too small to communicate that portion of the status data. Subsequently, the status data is updated to indicate that the next five packets are also successfully received (e.g., "ACK<=10"). Because the "ACK<=10" status implies the "ACK<=5" status, it may be inefficient to communicate both, and only the latter may be communicated over the return link.

In other embodiments, the status data blocks 330 are configured to work effectively in the situations where only a portion of a block is uploaded. For example, each status data block 330 may contain a series of smaller blocks, each being preceded with a size and an identifier, each including useful information, and each arranged in order of importance. Updated status data may begin with the identifier of the most recently received packet, followed by a list of NACKs that require immediate action, and so forth. Subsequent smaller blocks could contain more information about history, statistics, and the like. Then, because the client optimizer 120 is aware of what items were previously uploaded, the client optimizer 120 can adjust what is sent, as needed, to insure that the receiver receives the most important (e.g., or all the necessary) data. Similarly, various techniques are possible for using multiple control words and/or status data blocks 330 (e.g., or sub-blocks). For example, the client optimizer 120 can dynamically adjust the selection and order of blocks to be uploaded, and/or all or part of a block that is not sent can be discarded or overwritten if superseded or otherwise no longer important.

In still other embodiments, multiple status data blocks 330 for subordination and/or prioritization. In one such embodiment, multiple status data blocks 330 can be assigned different priorities for storing different types of data. For example, one status data block 330 is used for ACKs, a second status data block 330 is used for NACKs, a third status data block 330 is used for FEC data, etc., and the status data blocks 330 may be read out for upload in priority order.

It will be appreciated that, unlike in many conventional queues, data in a dynamic buffer can be discarded without uploading if it is replaced by updated data or is no longer as important as new data. Furthermore, the client optimizer 120 may have full dynamic control over what is sent and the order that it is sent up until the instant where the link layer 230a desires to fills a grant (e.g., at which point, the status data block 330 may be locked, toggled, etc.), and part of the buffer can be sent while the rest of the buffer may be discarded. By contrast, many conventional queuing techniques will always finish uploading a particular packet as the next byte is sent, without regard for the significance or usefulness of the data.

Notably, while certain features may be realized using dynamic buffering instead of packet queuing, some types of data communications may still be facilitated using packet queues and/or other types of memory. For example, the shared memory module 225 may include one or more dynamic buffers and one or more queues. While certain types of status data are stored in a dynamic buffer, other types of data, including certain types of overhead data, may be stored in packet queues.

Figure 4:
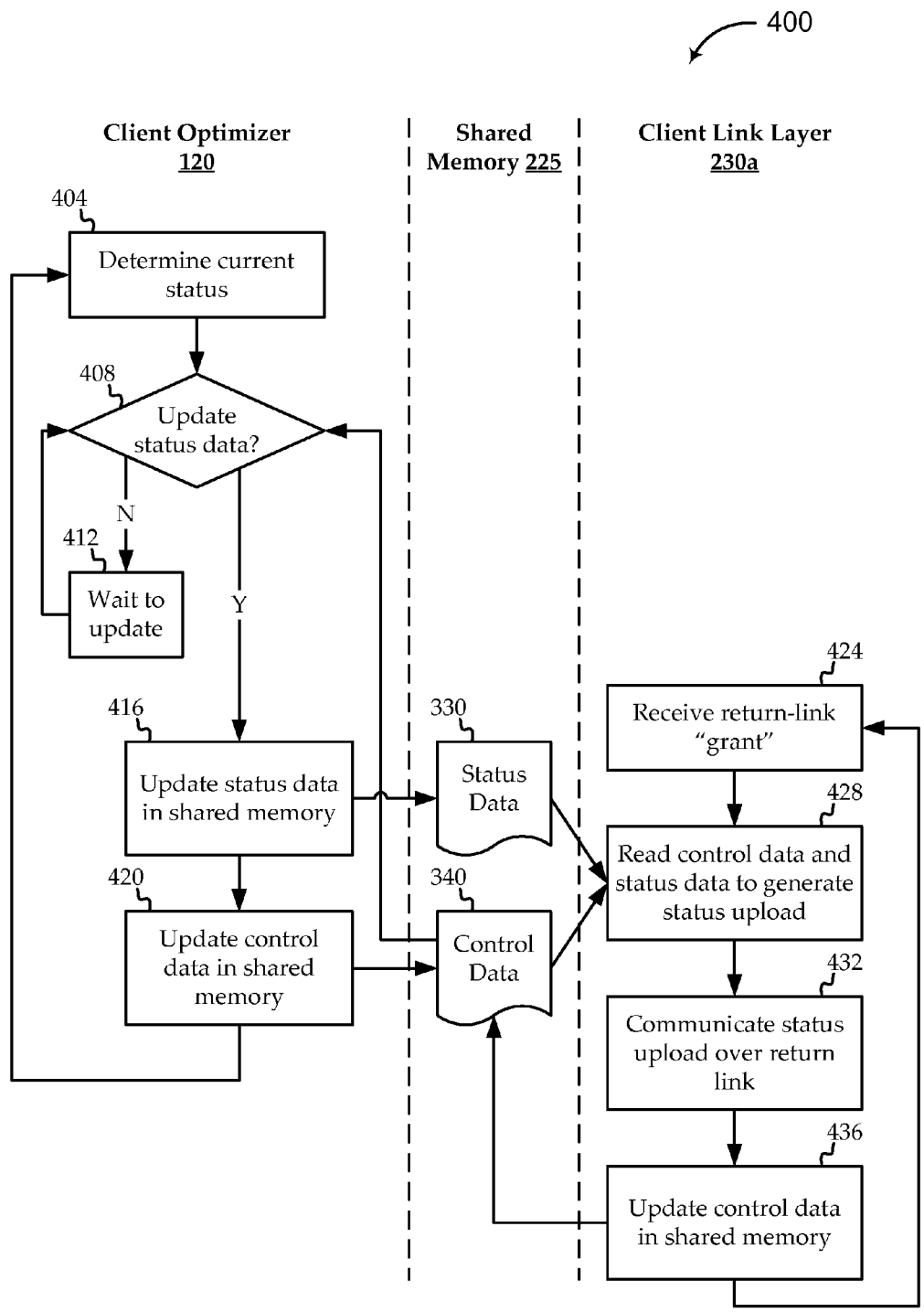
FIG. 4 shows a flow diagram of an illustrative method for efficient communication of transport status data over a return link, according to various embodiments.

Turning to FIG. 4, a flow diagram is shown of an illustrative method 400 for efficient communication of transport status data over a return link, according to various embodiments. The method 400 is shown in the context of various system components for the sake of clarity and context, including a client optimizer 120, link layer 230a, and shared memory module 225, such as those described with reference to FIGS. 2 and 3. Notably, the specific components shown should not be construed as limiting the scope of the method, as other embodiments may implement techniques of the method 400 using different components without departing from the scope of the disclosure or the claims.

Embodiments of the method 400 begin at block 404 by determining a current status. For example, the client optimizer 120 maintains and/or generates dynamically changing information, like whether certain packets are successfully received, FEC data, size and content of a partial packet, etc. As described above, it may be desirable to update a current status (e.g., in a status data block 330), according to the status data determined and/or generated in block 404. At block 408, a determination is made as to whether the client optimizer 120 can update the status data. For example, as described above, certain embodiments may prevent the client optimizer 120 from updating status data while the link layer 230a is reading out the status data from the status data blocks 330. As illustrated, this determination may be made according to current contents or status of control data 340. For example, the control data 340 may indicate that the shared memory 225 is currently locked for writing (e.g., the shared memory 225 is currently being read or is about to be read by the link layer 230a), the control data 340 may indicate that the update should be written to a different data block of the shared memory 225, etc.

If it is determined at block 408 that status data 330 should not be updated (e.g., that the link layer 230a has commenced upload and/or read-out of status data 330), the client optimizer 120 may wait to update any status data blocks 330 with current status data, according to block 412. If it is determined at block 408 that status data 330 can currently be updated (e.g., that the link layer 230a has not commenced upload and/or read-out of the status data 330), the client optimizer 120 may update one or more status data blocks 330 with current status data at block 416.

At block 420, control data is updated in the control data block 340 according to current status updates. For example, a control word is written indicating the current address in the shared memory module 225 of the most recent status data, the bytes available to the link layer 230a for upload, and bytes of that status data block 330 consumed by the link layer 230a in any previous uploads. In some embodiments, the client optimizer 120 may return to block 404 to again determine current status (e.g., periodically).

Notably, even in embodiments where the client optimizer 120 and the link layer 230a are closely coupled, each may be implementing portions of the method 400 independently, concurrently, asynchronously, etc. Accordingly, at some time that may effectively be any time within the implementation by the client optimizer 120 of blocks 404-420, the link layer 230a may receive a grant at block 424. For example, the link layer 230a receives a grant allocation from a proxy partner (e.g., at a server system) for upload of at least some of the current status data from the status data blocks 330.

At block 428, the link layer 230a reads the control data from the control data block 340 and the status data from the status data blocks 330 to generate a status upload. For example, the control data indicates to the link layer 230a where the most recent status data is located in the shared memory module 225 and how many bytes are available for upload. The link layer 230a may determine how to generate the status upload according to the grant allocation received at block 424. For example, the number of blocks allocated for the grant may be filled using certain amounts and/or priorities of data from the status data blocks 330.

The status data may be uploaded at block 432. For example, the link layer 230a may upload the status data to the partner optimizer in fulfillment of the grant over the return link. As discussed above, the uploaded status data may include acknowledgement data, FEC data, partial packets, etc. At block 436, control data is uploaded in the control data block 340 of the shared memory module 225. For example, the control data 340 is updated to reflect the bytes consumed by the upload. In some embodiments, updating the control data 340 directly or indirectly influences the actions of the client optimizer 120. For example, as discussed with reference to block 408, updating the control data 340 may effectively change a memory state to indicate temporary locking of one or more status data blocks 330, directing the client optimizer 120 to begin writing to a different status data block 330 (e.g., according to a ping pong scheme), etc.

Figure 5:
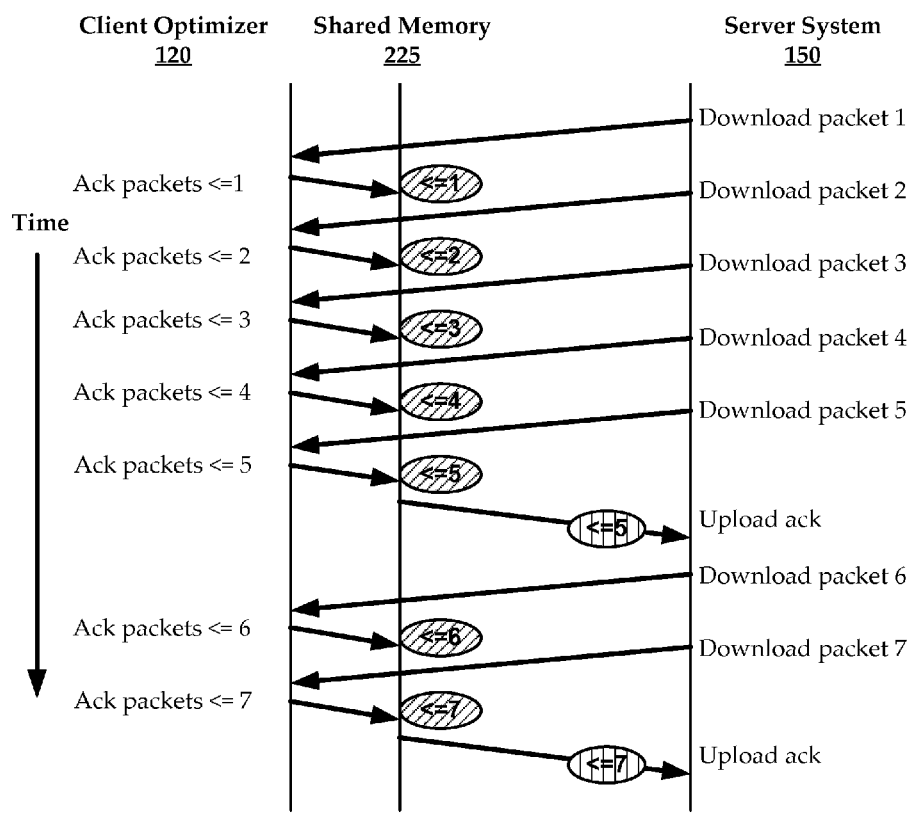
FIG. 5 shows a time-flow chart demonstrating use of a dynamic buffer to replace packet queuing for ACK packets, according to various embodiments.

It will be appreciated that the buffering techniques described above with reference to FIGS. 1-4 are applicable to many types of data and can be used in many types of communications systems. For the sake of illustration, FIG. 5 shows a time-flow chart 500 demonstrating use of a dynamic buffer to replace packet queuing for ACK packets, according to various embodiments. For added context, the time-flow chart 500 illustrates communications between a server system 150 and a client optimizer 120 in communication with a shared memory module 225 over some amount of time (indicated by a vertical timeline).

As illustrated, packet 1 is downloaded from the server system 150 to the client optimizer 120. The client optimizer 120 processes the downloaded packet and places an ACK packet in the shared memory module 225. The ACK packet remains in the shared memory module 225 as part of a current status, awaiting a grant for upload to the server system 150 in acknowledgement of successful receipt of the packet.

Subsequently, packets 2-5 are downloaded. After each is received successfully, new ACK information is generated. Rather than generating a new ACK packet each time and pushing the ACK packets to a queue, the existing ACK packet is updated to reflect additional successes (e.g., indicated as "ACK<=5"). The updated ACK packet effectively combines the information from five separate ACK packets into a single ACK packet having only one header, a potentially reduced payload, etc. After receiving the fifth packet, a grant is received from the server system 150. The single combined ACK packet is uploaded to the server system 150 according to the protocol.

Packets continue to be downloaded, and the ACK packet continues to be updated in the shared memory module 225. In some embodiments, having uploaded the "ACK<=5" packet to the server system 150, it may be desirable to restart the ACK packet with a new sequence. In other embodiments, the ACK packet maintains a running status for some amount of time or some amount of data. For example, in the event that the "ACK<=5" packet is dropped, maintaining a running total allows the next ACK packet (e.g., "ACK<=7") to preserve the ACK information.

Notably, sending the ACK packets in a consolidated manner provides various features. One such feature is a reduction of return-link bandwidth used to communicate the ACK information back to the server system 150. Another such feature is that the likelihood of not having sufficient space in the grant allocation to send the consolidated ACK packet is low.

It is worth noting that certain embodiments use the client optimizer 120 to generate and/or maintain various types of status data, including, for example, a consolidated ACK packet. However, other embodiments may implement similar types of functionality at lower layers. For example, in one embodiment, the client optimizer 120 generates ACK information (e.g., non-consolidated ACK packets) at a transport layer (e.g., Layer 4 of the OSI stack, using the transport management modules 220 of FIG. 2, etc.). These data are communicated to the link layer 230a, which optimizes the status data, for example by consolidating ACK packets (e.g., at Layer 2 of the OSI stack).

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps, and means described above may be done in various ways. For example, these techniques, blocks, steps, and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine-readable mediums for storing information. The term "machine-readable medium" includes, but is not limited to portable or fixed storage devices, optical storage devices, wireless channels, and/or various other storage mediums capable of storing that contain or carry instruction(s) and/or data.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

While the principles of the disclosure have been described above in connection with specific apparatuses and methods, it is to be clearly understood that this description is made only by way of example and not as a limitation on the scope of the disclosure.

What is claimed is:

1. A method comprising:
receiving an upload allocation at a link layer of a user system from a partner system over a communications link, the upload allocation indicating an amount of resources allocated for communications to the partner system over a return link portion of the communications link;
generating, using a client optimizer of the user system, status data indicating a current state of dynamically changing data intended for upload to the partner system;
overwriting at least a portion of a status data block with the status data using the client optimizer, the status data block stored in a dynamic buffer implemented at an interface between the link layer and the client optimizer;
generating a status upload comprising at least some of the status data in the status data block;
determining whether the status upload is currently being generated, such that the status data is being read by the link layer from a first location in the dynamic buffer;
overwriting at least a portion of the status data block with the status data using the client optimizer at the first location in the dynamic buffer when the status upload is not currently being generated;
overwriting at least a portion of the status data block with the status data using the client optimizer at a second location in the dynamic buffer when the status upload is currently being generated; and
communicating the status upload to the partner system over the return link in accordance with the upload allocation using the link layer.

2. The method of claim 1, wherein the client optimizer and the link layer are closely coupled and the dynamic buffer is implemented as a shared memory, such that information can be communicated between the client optimizer and the link layer via the shared memory without packetization of the information.

3. The method of claim 1, wherein overwriting at least a portion of the status data block with the status data using the client optimizer comprises writing control data to a control data block, the control data indicating a location of the status data block in the dynamic buffer and a size of the status data block.

4. The method of claim 3, wherein generating the status upload comprises:
reading the control data to determine the location of the status data block in the dynamic buffer and the size of the status data block;
reading the status data block according to the control data to generate the status data upload; and
updating the control data to the control data block, the control data indicating an amount of the status data block consumed by the status data upload.

5. The method of claim 1, wherein the status upload comprises an indication of successful receipt at the user system of at least two packets consolidated into a single status packet.

6. The method of claim 1, wherein the status upload comprises information relating to at least one of successful receipts at the user system of downloaded packets, unsuccessful receipts at the user system of downloaded packets, forward error correction data corresponding to downloaded packets, or a partial packet.

7. The method of claim 1, wherein:
the link layer is configured to provide link layer functionality according to a protocol stack model; and
the client optimizer is configured to provide transport layer and application layer functionality according to a protocol stack model.

8. The method of claim 1, wherein:
the communications link comprises a satellite communications link;
the user system comprises a user terminal; and
the upload allocation is a grant of satellite return-link bandwidth resources to the user terminal from a satellite gateway.

9. A user system comprising:
a shared memory subsystem comprising a dynamic buffer configured to store a status data block;
a link management subsystem, communicatively coupled with the shared memory subsystem and communicatively coupled with a partner system over a communications link, and configured to:
receive an upload allocation from the partner system indicating an amount of resources allocated for communications to the partner system over a return link portion of the communications link; and
generate a status upload comprising at least a portion of the status data block for upload to the partner system over the return link in accordance with the upload allocation; and
a client optimizer, communicatively coupled with the shared memory subsystem such that the memory subsystem is implemented at an interface between the link management subsystem and the client optimizer subsystem, and configured to periodically overwrite at least a portion of the status block with dynamically changing status data for upload by the link management subsystem;
wherein the client optimizer subsystem is configured to overwrite at least a first portion of the status block with the dynamically changing status data when the status upload is not currently being generated by the link management subsystem according to the status data in the first portion of the status block and overwrite at least a second portion of the status block with the dynamically changing status data when the status upload is currently being generated by the link management subsystem according to the status data in the first portion of the status block.

10. The user system of claim 9, wherein the client optimizer is configured to periodically overwrite at least a portion of the status block with the dynamically changing status data for upload by the link management subsystem by:

determining current version of the dynamically changing status data;

writing the current version of the dynamically changing status data to the status data block to replace at least a portion of a previous version of the dynamically changing status data; and writing control data to a control data block indicating a location of the status data block in the dynamic buffer and a size of the status data block.

11. The user system of claim 10, wherein the link management subsystem is configured to generate the status upload by:

reading the control data to determine the location of the status data block in the dynamic buffer and a size of the status data block;

reading the status data block according to the control data to generate the status data upload; and updating the control data to the control data block, the control data indicating an amount of the status data block consumed by the status data upload.

12. A computer program product residing on a non-transitory processor-readable medium disposed at a user system and comprising processor-readable instructions, which, when executed, cause a processor to perform steps comprising:

receiving an upload allocation at a link layer of a user system from a partner system over a communications link, the upload allocation indicating an amount of resources allocated for communications to the partner system over a return link portion of the communications link;

generating, using a client optimizer of the user system, status data indicating a current state of dynamically changing data intended for upload to the partner system;

overwriting at least a portion of a status data block with the status data using the client optimizer, the status data block stored in a dynamic buffer implemented at an interface between the link layer and the client optimizer;

generating a status upload comprising at least some of the status data in the status data block;

communicating the status upload to the partner system over the return link in accordance with the upload allocation using the link layer;

overwriting the at least a portion of the status data block with the status data using the client optimizer by writing control data to a control data block, the control data indicating a location of the status data block in the dynamic buffer and a size of the status data block; and setting a read-out state using the link management controller while generating the status upload;

wherein the overwriting step is performed according to the read-out state, such that the client optimizer controller cannot write to a portion of the status block currently being read out by the link management controller as part of generating the status upload.

\* \* \* \* \*